United States Patent
Greiss

[19]

[11] Patent Number: 5,963,604
[45] Date of Patent: Oct. 5, 1999

[54] COMMUNICATION SIGNAL RECEIVER WITH SAMPLING FREQUENCY CONTROL

[75] Inventor: Israel Greiss, Raanana, Israel

[73] Assignee: National Semiconductor Corp., Santa Clara, Calif.

[21] Appl. No.: 08/975,406

[22] Filed: Nov. 20, 1997

Related U.S. Application Data

[63] Continuation-in-part of application No. 08/556,532, Nov. 13, 1995, Pat. No. 5,731,728.

[51] Int. Cl.$^6$ ............................................. H04L 7/00
[52] U.S. Cl. .................................................. 375/355
[58] Field of Search .................... 375/355, 371, 375/373, 316; 327/298, 299, 142

[56] References Cited

U.S. PATENT DOCUMENTS

| | | |
|---|---|---|
| 4,929,849 | 5/1990 | Paul ........................................ 327/155 |
| 5,200,981 | 4/1993 | Carmon . |
| 5,297,172 | 3/1994 | Shenoy et al. ........................... 375/371 |
| 5,488,627 | 1/1996 | Hardin et al. . |
| 5,731,728 | 3/1998 | Greiss ...................... 327/299 |

*Primary Examiner*—Tesfaldet Bocure
*Attorney, Agent, or Firm*—Limbach & Limbach L.L.P.

[57] ABSTRACT

A communication signal receiver performs a timing adjustment function of sampling with a circuit that also reduces the amount of electromagnetic interference (EMI) emitted from the receiver. The receiver includes an analog front end circuit that samples an input modulated carrier waveform responsive to a sampling clock signal to generate a digitized replica. The timing of the sampling is responsive to a timing signal. The digitized replica is analyzed to determine an appropriate adjustment to the sampling and, thus, to the timing signal. The frequency of the sampling is changed in accordance with the timing signal as adjusted, without adjusting the phase of the sampling. In particular, the frequency of the sampling is changed by removing transitions from an input clock signal to generate the sampling clock signal.

12 Claims, 9 Drawing Sheets

COMMUNICATION SIGNAL RECEIVER WITH SAMPLING FREQUENCY CONTROL

RELATED APPLICATIONS

The present application is a CIP of U.S. patent application Ser. No. 08/556,532 filed Nov. 13, 1995 now issued as U.S. Pat. No. 5,731,728 on Mar. 24, 1998.

TECHNICAL FIELD

The present invention relates to sampling of digital data in analog communication signals and, in particular, to a sampling circuit and method that includes circuitry for controlling the sampling frequency.

BACKGROUND

It is well known to transmit, as communications signals, digital data within a modulated carrier waveform. Timing information is included within the communication signals to provide sampling points for an analog to digital converter (ADC) to recover the digital data. While being transmitted, the modulated carrier waveform suffers from distortion. Thus, when received, the signal should be filtered to improve the signal-to-noise ratio.

In a conventional modem, for example, the signal filtering and timing recovery tasks are performed by separate functional units. Analog-to-digital conversion circuitry ("analog front end") samples the received modulated carrier waveform responsive to a sampling clock to convert the carrier waveform to a digitized replica. A processor executes a program to recover the digital data from the digitized replica using a timing signal recovered from the modulated carrier waveform. In addition, a control function (usually executed within a processor) analyzes the recovered timing signal, and in response thereto, adjusts the phase of the sampling by the analog front end.

BRIEF DESCRIPTION OF THE DRAWINGS

FIG. 1—1 is a block diagram which illustrates an embodiment of a communication signal receiver in accordance with the invention.

FIG. 11 is a block diagram of one possible implementation of the FIG. 3 circuitry.

SUMMARY

A communication signal receiver in accordance with the present invention performs a timing adjustment function of sampling with a circuit that also reduces the amount of electromagnetic interference (EMI) emitted from the receiver.

In one embodiment, the receiver includes an analog front end circuit that samples an input modulated carrier waveform responsive to a sampling clock signal to generate a digitized replica. The timing of the sampling is responsive to a sampling timing signal. The digitized replica is analyzed to determine an appropriate adjustment to the sampling and, thus, to the timing signal. The frequency of the sampling is changed in accordance with the sampling timing signal as adjusted, without adjusting the phase of the sampling. In particular, the frequency of the sampling is changed by removing transitions from an input clock signal to generate the sampling clock signal.

A better understanding of the features and advantages of the invention will be obtained by reference to the following detailed description and accompanying drawings which set forth an illustrative embodiment in which the principles of the invention are utilized.

DETAILED DESCRIPTION

Figure 11:
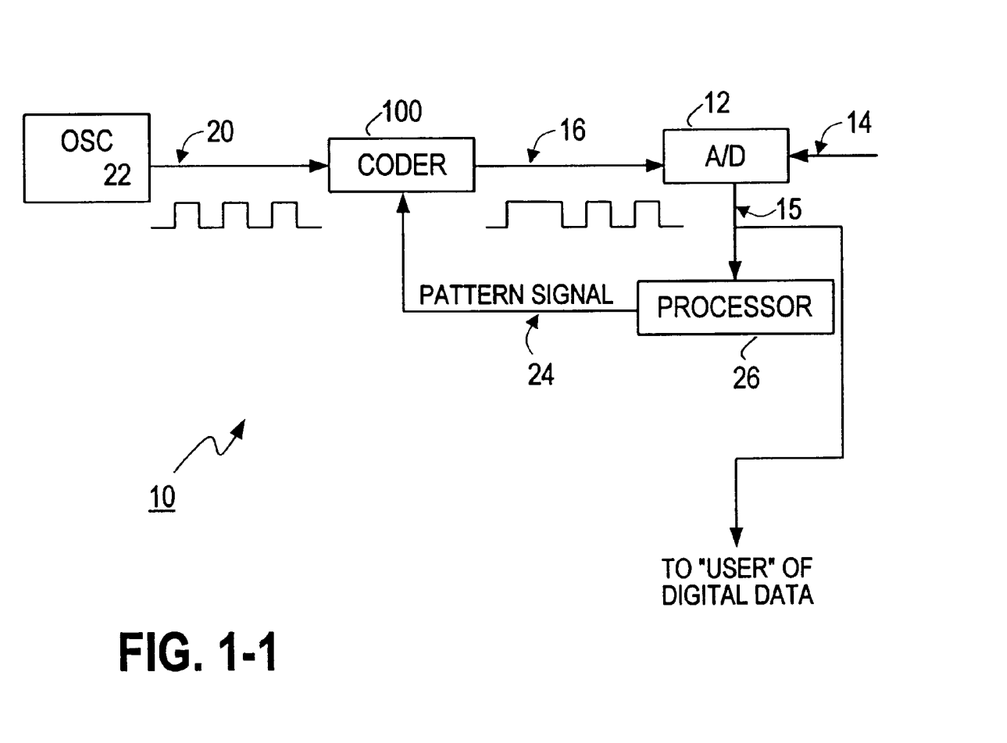

FIG. 1—1 illustrates a communication signal receiver 10 in accordance with an embodiment of the present invention. An analog-to-digital converter ("ADC") 12 samples an input modulated carrier waveform 14, responsive to a sampling clock signal 16, to generate a digital replica 15 of the input modulated carrier waveform 14.

The sampling clock signal 16 is generated by a coder 100 responsive to a period clock signal 20 output from an oscillator 22 and to a pattern signal 24 generated by a processor 26. The processor 26 executes a special purpose program that analyzes the digitized replica 15 to generate the pattern signal 24.

The operation of the coder 100 responsive to the pattern signal 24 is now described with reference to the example timing diagram in FIGS. 2A through 2C. It is noted that the coder 100 may be entirely implemented on a component external to a processor, or either selected portions of the clock generation circuitry or perhaps all of the clock generation circuitry may be integrated with the processor.

An input clock signal 102 (FIG. 2A) is received by the clock generation circuitry 100 at a terminal 104. The input clock signal, for example, may be the output of a stable crystal oscillator. A modulator 106 modulates the input clock signal 102 to generate a modulated clock signal 108 (FIG. 2B). In particular, the modulator removes a selected number ("x") transitions of the input clock signal per "L" transitions of the input clock signal 102. Moreover, since the transitions of the modulated clock signal 108 occur at regular points, it is easy for the microprocessor to synchronize to the modulated clock signal.

Figure 2A:
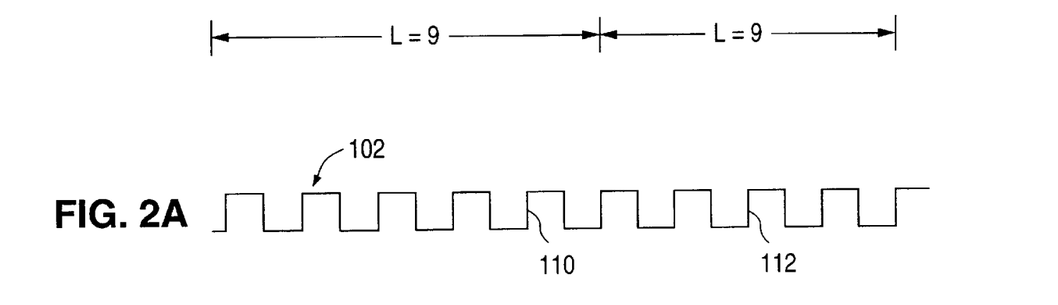
FIGS. 2A through 2C are timing diagrams which illustrate the operation of the FIG. 1 circuitry.
Figures 2B, 2C:
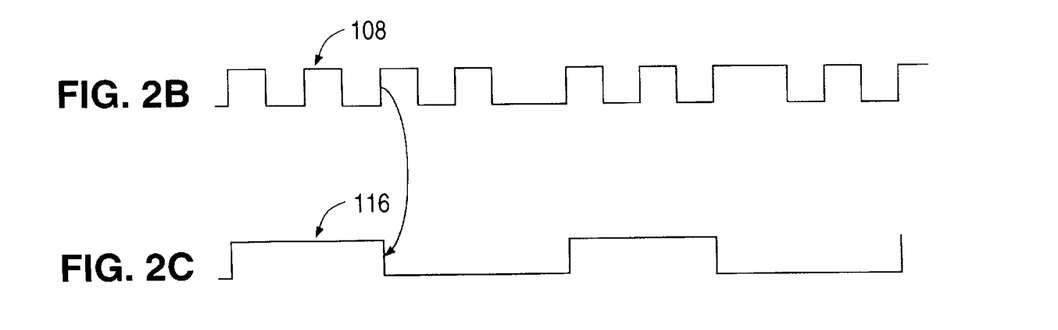

Referring to the example shown in FIGS. 2A and 2B, it can be seen that the modulator 106 has removed two transitions, labelled 110 and 112, out of nine transitions of the input clock signal 102 to generate the modulated clock signal 108. Finally, if needed by a particular system, a divider 114 divides the modulated clock signal 108 by M, where M is an integer that is evenly divisible into L-x, to generate a jitter-free "pure" clock signal 116 (FIG. 2C). The pure clock signal 116 may be utilized by a microprocessor analog front end without degrading the performance of the analog front end.

The clock signal 116 has a frequency which is reduced from the input clock signal 102. However, it is noted that a higher frequency input clock signal may be used without exacerbating the EMI emission since the whole band-width of the input clock signal is available for EMI spreading. That is, using the invention, the frequency of the input clock signal can be increased without causing a concomitant increase in EMI emission. Also, as will be discussed in greater detail below, the faster the input clock signal, the greater the EMI suppression improvement can be achieved for a particular desired frequency jitter-free clock signal.

Figure 3:
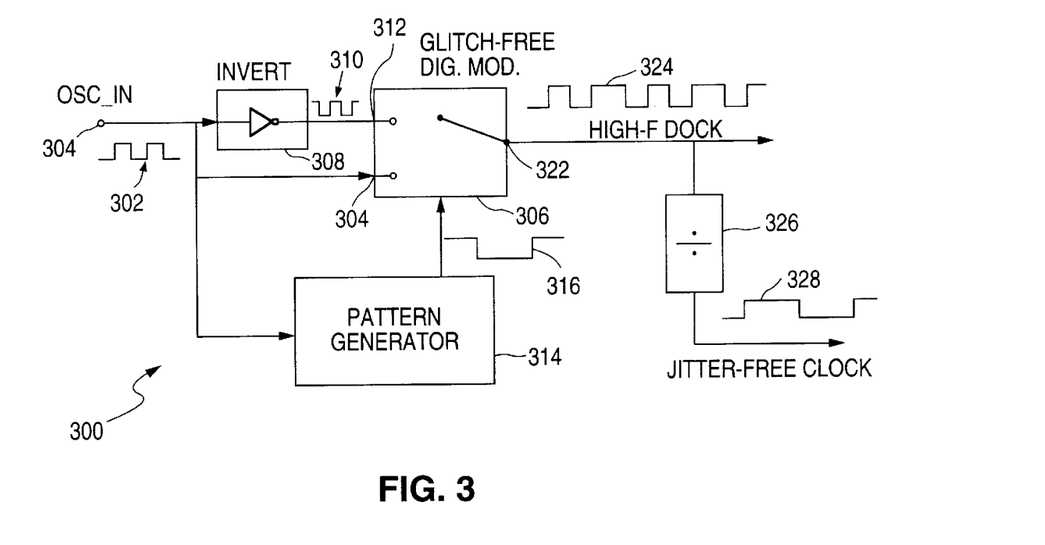
FIG. 3 is a block diagram of an embodiment 300 of the coder in greater detail.
Figure 4A:
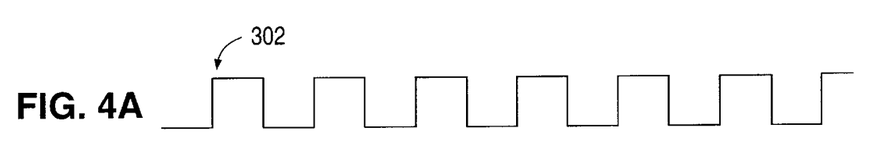
FIGS. 4A through 4E are timing diagrams which illustrate the operation of the FIG. 3 circuitry.
Figure 4B:
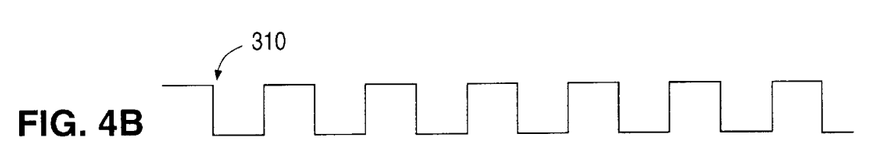

FIG. 3 is a block diagram of an embodiment 300 of the invention in greater detail. The circuitry 300 is now explained with reference to the example timing diagram in FIGS. 4A through 4E. An input clock signal 302 (FIG. 4A) is received by the clock generation circuitry 300 at an input terminal 304. The input clock signal 302 is provided both to a first input 304 of a digital modulator 306 and to an invert circuit 308. The invert circuit 308 inverts the input clock signal 302 by about one half clock cycle ("about", since the invert circuit 308 also has a delay effect on the input clock signal 302) and provides the resultant inverted delayed clock signal 310 (FIG. 4B) to a second input 312 of the digital modulator 306.

Figure 4C:
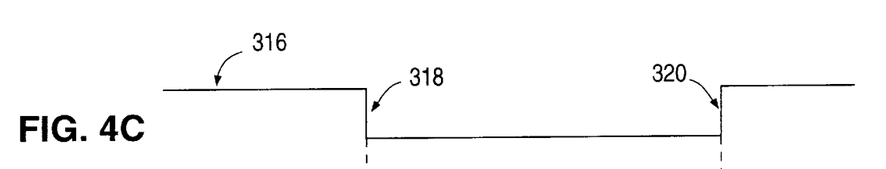
Figure 4D:
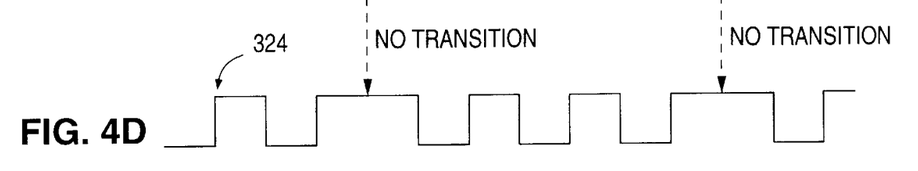
Figure 4E:
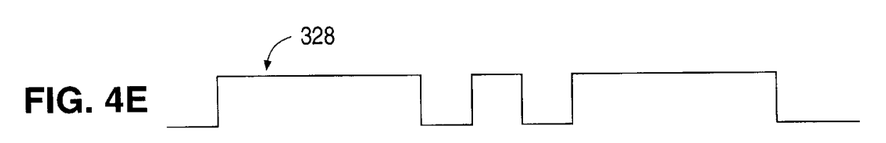

A pattern generator 314 also receives the input clock signal 302 and generates a pattern signal 316 (FIG. 4C) which has transitions 318 and 320, in response to the input clock signal 302. The digital modulator provides one of the input clock signal 302, received at the first input terminal 304, and the inverted input clock signal 310, received at the second input terminal 312, to an output terminal 322 as a high frequency clock signal 320 (FIG. 4D). Furthermore, in response to each transition in the pattern signal 316, the digital modulator 306 provides the other of the input clock signal 302 and the inverted input clock signal 310 to the output terminal 322. The digital modulator 306 performs this switching without glitching.

The pattern signal 316 generated by the pattern generator 314 is composed of "frames" which corresponds to a particular number (which may be programmable) of cycles of the input clock signal 302. Significantly, the pattern signal 316 has the same number of transitions each frame. Each transition of the pattern signal 316 has the effect of causing the high frequency clock signal 324 to "skip" a transition.

Figure 1:
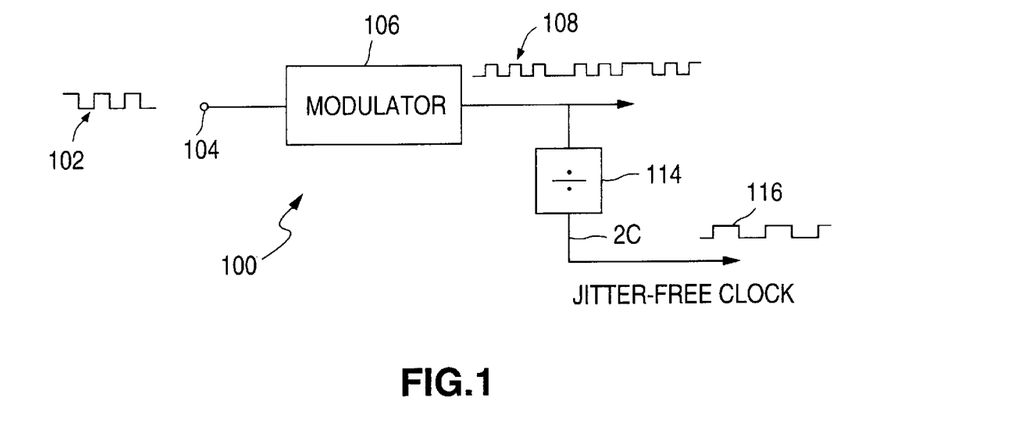
FIG. 1 is a block diagram which illustrates how the sampling clock signal is generated by the coder.

The high frequency clock signal 324 is provided to a divider 326, which provides a divided clock signal 328 which is utilized by the ADC 12 (FIG. 1) as the sampling clock signal 16. In particular, the divider 326 divides the high frequency clock signal 324 by a number which is even divisible into the number of input clock signal 302 transitions that constitute a pattern signal 316 frame. All that is required for the clock signal 328 to be jitter-free is that the pattern signal 316 have the same number of transitions each frame. In this regard, the pattern signal 316 may be characterized by a deterministic pattern, a random (or pseudo-random pattern), or a combination of the two. (As used throughout this specification, including the claims, the term "random" is to be interpreted to also include "pseudo-random".)

Figure 5:
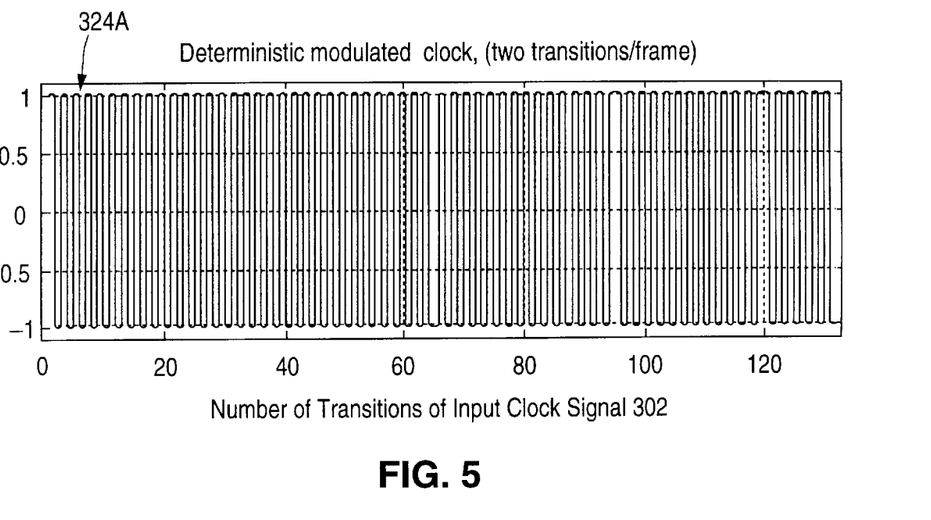
FIG. 5 illustrates a high-frequency clock signal which may be generated by the FIG. 3 circuitry.

For example, referring to FIG. 5, the pattern signal used to generate a high frequency clock signal 324A shown therein is deterministic and is repeated each 64 transitions of the input clock signal 302. That is, the pattern signal 316A has a 64 transition frame. The pattern signal causes the digital modulator 322 to generate the high-frequency clock signal 324A having two transitions of the input clock signal 302 skipped in each 64 transition frame of the pattern signal. To generate the FIG. 5 pattern signal, the FIG. 3 pattern generator 314 may be a PAL-implemented sequencer which sequences to a next state responsive to either the input clock signal 302 or to a divided-down version of the input clock signal 302.

Figure 6:
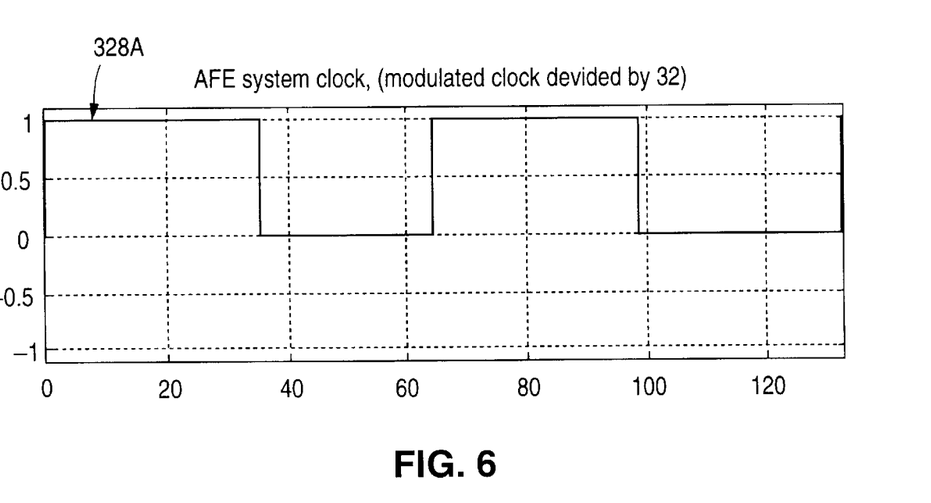
FIG. 6 shows the jitter-free clock signal that results from the divider (FIG. 3) having divided the FIG. 5 high-frequency clock signal by 32.
Figure 7:
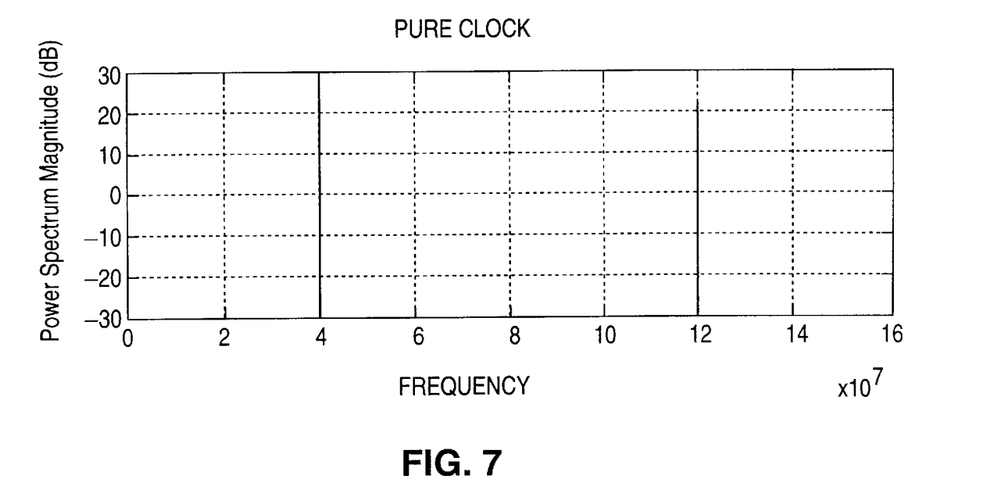
FIG. 7 shows an example of the frequency spectrum of a "pure" input clock signal.
Figure 8:
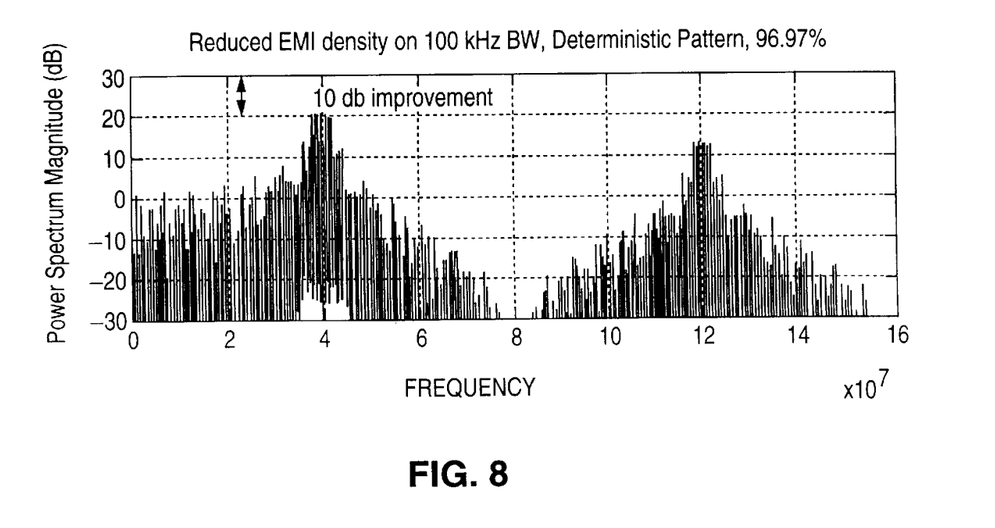
FIG. 8 shows the frequency spectrum of the corresponding FIG. 5 modulated high-frequency clock signal in which a 10 dB improvement is realized.

FIG. 6 shows the jitter-free clock signal 328 that results from the divider 326 having divided the FIG. 5 high-frequency clock signal 324A by 32. FIG. 7 shows an example of the frequency spectrum of a "pure" input clock signal 302. FIG. 8 shows the frequency spectrum of the corresponding FIG. 5 modulated high-frequency clock signal in which a 10 dB improvement is realized.

Figure 9:
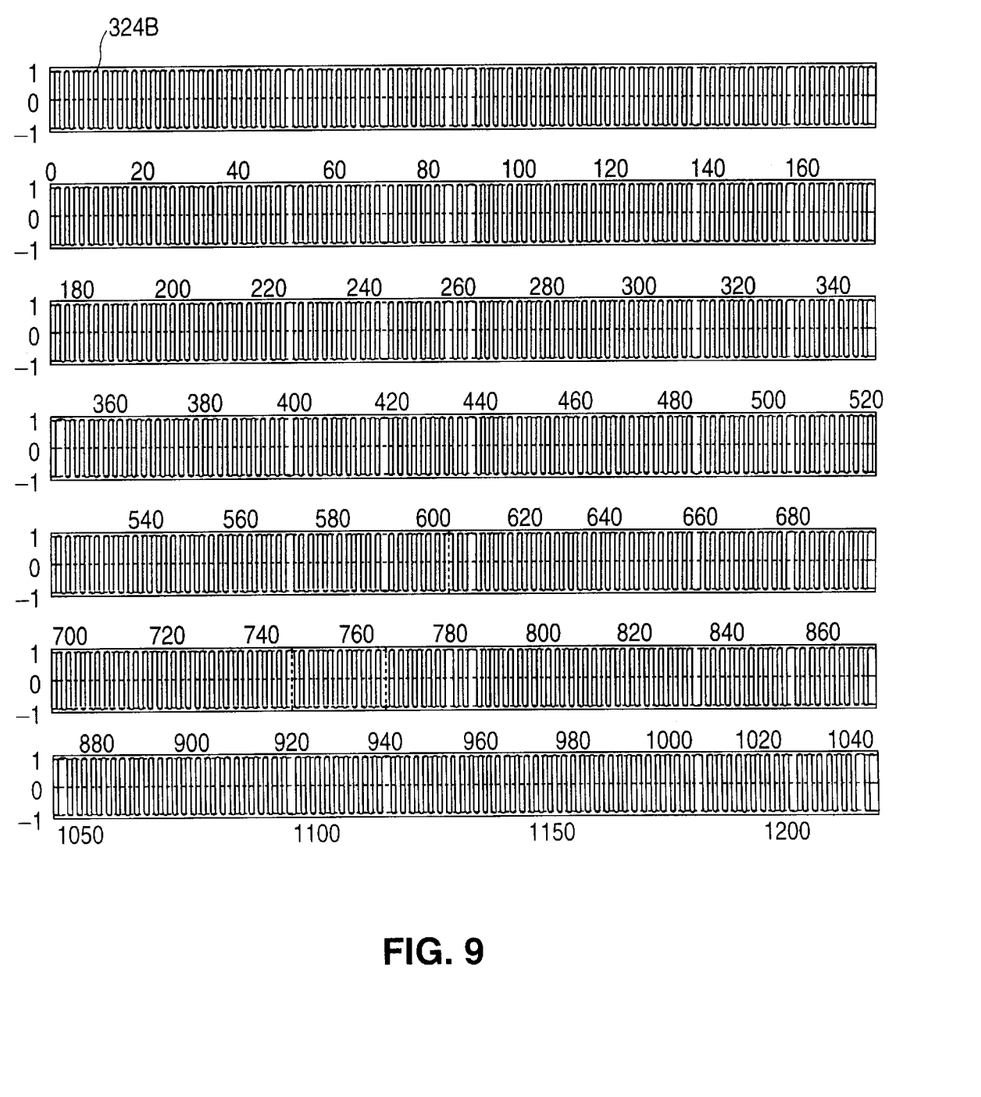
FIG. 9 illustrates a high-frequency clock signal which may be generated by the FIG. 3 circuitry, where the pattern signal generated by the FIG. 3 pattern generator has three transitions per 64 transitions of the input clock signal.
Figure 10:
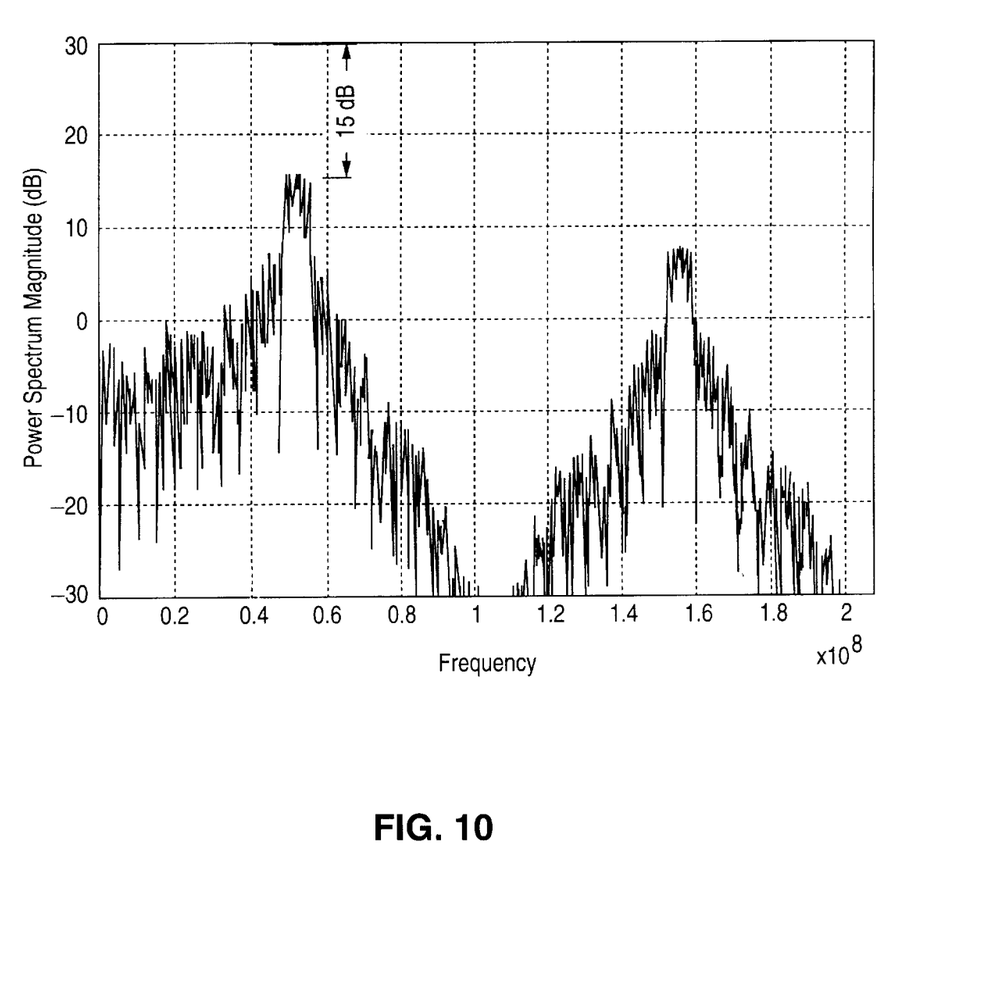
FIG. 10 shows the frequency spectrum of the high frequency clock signal that results where one of two particular deterministic sequences is chosen at random as the pattern signal.

As another example, the pattern signal used to generate the high frequency clock signal 324B shown in FIG. 9 has three transitions per 64 transitions of the input clock signal 302. For any given frame, the three transitions of the input clock signal 302 that are skipped to generate the high frequency clock signal are selected from a first set, in which the skipped transitions are transitions 1, 25, and 35 of the input clock signal 302 frame; and a second set, in which the skipped transitions are transitions 25, 35, and 42 of the input clock signal 302 frame. A random sequence is used to select either set 1 or set 2 for the frame. FIG. 10, which shows the frequency spectrum of the high frequency clock signal 324B, illustrates that a 15 dB improvement is realized.

Figure 12A:
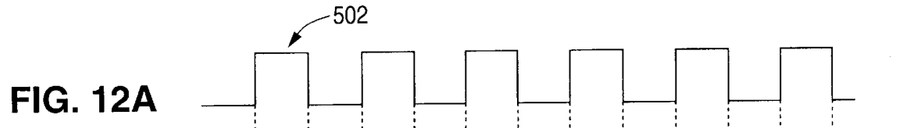
FIGS. 12A through 12F are timing diagrams which illustrate the operation of the FIG. 11 circuitry.
Figure 12B:
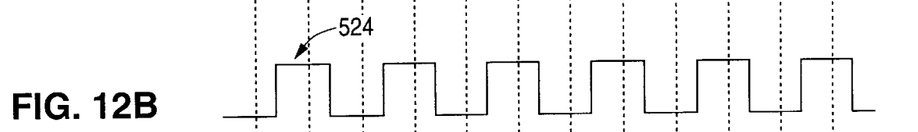
Figure 12C:
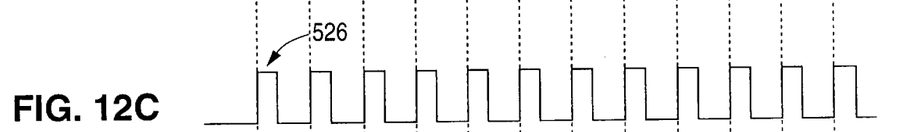
Figure 12D:
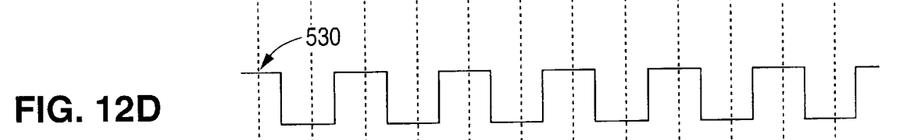
Figure 12E:
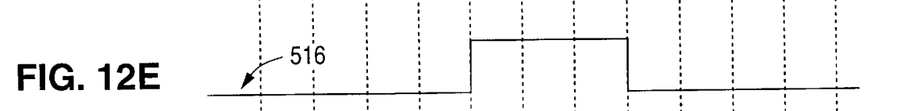

FIG. 11 is a block diagram of one possible implementation of the FIG. 3 circuit. The inverter 508, the inverter 528, and the XOR device 530 collectively have the effect of providing a "double frequency" clock (i.e., which has one pulse for each transition, rising and falling, of the input clock signal 502 provided at input terminal 504). This can be seen with reference to the timing diagram in FIGS. 12A through 12F. FIG. 12A shows the input clock signal 502. FIG. 12B (signal 524) shows the input clock signal 502 after it has been passed through inverters 508 and 528; it can be seen that inverters 508 and 528 have the effect of delaying the input clock signal 502. FIG. 12C (signal 526) shows the input clock 502 XOR'ed with the delayed clock 524 by XOR device 530. Signal 526 is provided to the Cp clock input of D-type flip flop 532.

Now, the signal 536 provided to the D input of D-type flip flop 532 is the signal 530 provided by inverter 532, XOR'ed by XOR device 534 with the pattern signal 516 provided by pattern generator 514. Taking first the signal 530 provided by inverter 532, it can be seen that this signal is an inverted and delayed version of the input clock signal 502. Disregarding for the moment the effect of the XOR device 534, the signal 522 provided at the Q output 522 of the D-type flip flop 532 would be the input clock signal 502, inverted, sampled at each transition (i.e., rising and falling, as indicated by the pulses of signal 526) of the input clock signal 502. Put simply, disregarding the effect of the XOR device 534, the signal 522 provided at the output 522 of the D-type flip flop 532 would be identical to the input clock signal 502.

Figure 12F:
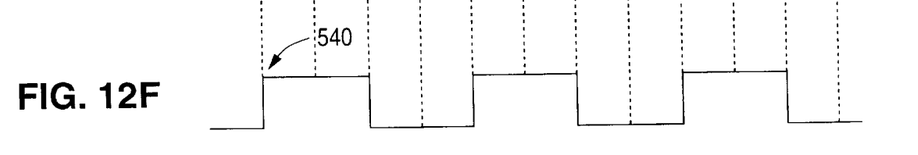

Now, the operation of the pattern generator 514 and its effect on the signal 522 provided at the Q output of the D-type flip flop 532 is discussed. The pattern generator receives the input clock signal 502, and the divider 538 of the pattern generator 514 divides down the input clock signal 502. For example, the divider 538 may divide the input clock signal by two to produce a divided input clock signal 540 (FIG. 12F). In this instance, the divided input clock signal 540 will have one rising transition for each two rising transitions of the input clock signal 502. Similarly, the divided input clock signal 540 will have one falling transition for each two falling transitions of the input clock signal 502. This can be seen with reference to FIG. 12F, where the divided input clock signal 540 shown is the input clock signal 502, divided down by a factor of two.

Since pattern signal generation is discussed above with respect to FIG. 3 and FIG. 4C, that discussion is not repeated here except to note that the FIG. 11 pattern generator is one which employs a sequencer 542 whose state is advanced by a sequencer clock signal 540, and the sequencer clock signal 540 is a divided-down version of the input clock signal 502.

With respect to FIG. 11, the effect of XOR device 534 is now discussed. In particular, when there is a transition in the pattern signal 516 produced by pattern generator 514, XOR device 534 has the effect of inverting signal 530 (which, remember, is an inverted and delayed version of the input clock signal 504). Thus, since the high frequency clock signal 522 provided at the Q output of the D-type flip flop 532 is identical to signal 536 at each rising transition of the "double frequency" signal 526, the pattern signal 516 has the effect of causing the D-type flip flop 532 to provide, to its Q output, a high-frequency clock signal 522 that is identical to the input clock signal 502, except with a transition dropped at each transition of the pattern signal 516.

The high-frequency clock signal 522 may be directly utilized by a microprocessor. The high frequency clock signal 522 is also divided, by a divider 544, to obtain a jitter-free clock signal which may be utilized by a microprocessor analog front end.

In one embodiment, the sequence length of the pattern signal 516 generated by the sequencer 542 was chosen to be 128; the divisor D by which divider 538 divides down the input clock signal 502 was chosen to be 4; and the number of transitions within each sequence of the pattern signal 516 was chosen to be 32. A formula for choosing the smallest non-unit divisor by which divider 544 can divide the high frequency clock signal 522 is discussed below.

Specifically, the smaller divisor "M" can be determined from the following formula:

$$M = (D*L) - \frac{X}{2}$$

where:
D is the divisor by which divider 538 divides down the input clock signal 502;
L is the sequence length of the pattern signal 516 produced by the sequencer 542 before repeating; and
X is the number of transitions in the pattern signal 516 per sequence.

For the embodiment just described, the divisor "M" would be:

$$M = (4*128) - \frac{32}{2} = 496$$

and there would be a 16 dB EMI improvement.

In another embodiment, the parameters were chosen to be as follows:

L=33; D=1; and X=2, resulting in a divisor "M" of 32. The sequencer 542 of this embodiment operates according to the following rule, where Sequence# is a modulo 132 counter that is advanced at each rising transition of the divided-down input clock signal 540:

if 0≦Sequence# ≦63 then
    output of sequencer is 1
else if 64≦Sequence# ≦92 then
    output of sequencer is 0
else if 93≦Sequence# ≦118 then
    output of sequencer is 1
else if 119≦Sequence# ≦131 then
    output of sequencer is 0

In general, it is desirable that the divisor "M" be relatively low in order to meet the high-frequency needs of a microprocessor analog front end. Also, it can be seen that each transition in the pattern signal causes the high frequency clock 522 to be lower than the input clock signal 502. For this reason, it is desirable to minimize the number of transitions "X" in the pattern signal 516 while still obtaining the required spectral spreading in the high frequency clock signal 522.

It should be understood that various alternatives and enhancements to the embodiments of the invention described herein may be employed in practicing the invention. For example, some or all of the parameters that control the clock circuit (e.g., integer constants, mode of operation, pattern generator function, and pattern signal transition points) may be programmable and, as such, may be loaded from external circuitry such as a microprocessor. It is intended that the following claims define the scope of the invention and that methods and apparatus within the scope of these claims and their equivalents be covered thereby.

What is claimed is:

1. A communication signal receiver, comprising:
a sampling circuit that samples an analog data signal and that converts the analog data signal to a digital replica of the analog data signal responsive to transitions of a sampling clock signal;
adjustment determination circuitry that analyzes at least a portion of the digital samples and determines an adjustment to the timing of the sampling in response to the analysis, the adjustment determination circuitry generating an adjustment signal indicative of the determined adjustment;
clock generation circuitry that generates the sampling clock signal, the clock generation circuitry including circuitry that modifies the frequency of the sampling clock signal responsive to the adjustment signal, the sampling clock signal including:
a) first circuitry that receives a first clock signal having transitions which alternate, from a first logic state to a second logic state and back to the first logic state; and
b) second circuitry that produces a modulated clock signal by removing x transitions from each of consecutive sets of L transitions of the first clock signal, where x and L are integers and 0<x<L.
c) circuitry that divides the modulated clock signal by M to generate the sampling clock signal, where M is an integer evenly divisible into L-x with no remainder, such that the sampling clock signal has exactly one transition for any set of M transitions of the modulated clock signal.

2. The circuit of claim 1, and wherein circuitry b) comprises circuitry that generates a pattern signal responsive to transitions of the first clock signal, wherein said circuitry b) removes said x transitions in response to the pattern signal.

3. The circuit of claim 2 wherein, for each of said consecutive sets of L transitions of the first clock signal, the pattern signal has exactly x transitions corresponding thereto, and wherein the x transitions removed from each of said consecutive sets of L transitions of the first clock signal by circuitry b) correspond one-to-one to said x transitions in the pattern signal.

4. The circuit of claim 1, wherein the x transitions removed by circuitry b) from each of said consecutive sets of L transitions of the first clock signal are randomly distributed among the L transitions.

5. The circuit of claim 1, wherein the x transitions removed by circuitry b) from each of said consecutive sets of L transitions of the first clock signal is predetermined.

6. The circuit of claim 1, wherein the x transitions removed from a particular set of L transitions of the first clock signal by circuitry b) are chosen from one of a first set of predetermined transitions and a second set of predetermined transitions.

7. The circuit of claim 6, and further comprising circuitry that generates a random sequence in response to the first clock signal, and wherein circuitry chooses between said first set of predetermined transitions and said second set of predetermined transitions in response to said random sequence.

8. The circuit of claim 1, and further comprising a microprocessor that receives both the modulated clock and the pure clock.

9. The circuit of claim 1, and further comprising circuitry for receiving and holding at least one of x and L from external circuitry.

10. The circuit of claim 1, and further comprising circuitry for receiving and holding at least one of x, L, and M from external circuitry.

11. The circuit of claim 10, and further comprising circuitry for programming which x transitions removed from each of said consecutive sets of L transitions of the first clock signal are the predetermined transitions.

12. The circuit of claim 1, wherein the x transitions removed from each of said consecutive sets of L transitions of the first clock signal by the circuitry that produces the second, modulated, clock signal are one of:

a. randomly distributed among the L transitions;

b. predetermined; and c. chosen from one of a first set of predetermined transitions and a second set of predetermined transitions.

* * * * *